June 25, 1968

H. S. KELLY 3,389,431

THERMOPLASTIC ARTICLES AND PROCESS AND
APPARATUS FOR MAKING SAME

Filed March 12, 1965

INVENTOR
H. S. KELLY

BY
ATTORNEYS

June 25, 1968

H. S. KELLY 3,389,431

THERMOPLASTIC ARTICLES AND PROCESS AND
APPARATUS FOR MAKING SAME

Filed March 12, 1965

*INVENTOR*
H. S. KELLY

BY

*Young & Quigg*
*ATTORNEYS*

June 25, 1968

H. S. KELLY 3,389,431

THERMOPLASTIC ARTICLES AND PROCESS AND
APPARATUS FOR MAKING SAME

Filed March 12, 1965

INVENTOR
H. S. KELLY

BY

ATTORNEYS

__United States Patent Office__  3,389,431
Patented June 25, 1968

3,389,431
THERMOPLASTIC ARTICLES AND PROCESS AND APPARATUS FOR MAKING SAME
Harold S. Kelly, Bartlesville, Okla., assignor to Phillips Petroleum Company, a corporation of Delaware
Filed Mar. 12, 1965, Ser. No. 439,181
2 Claims. (Cl. 18—14)

ABSTRACT OF THE DISCLOSURE

At least one reciprocating piston is positioned to contact the surface of an extruded article while the surface of the article is still in a deformable condition to cause an indentation in the surface. Various means are provided to actuate the piston or pistons, such as a rotatably reciprocating ring member with connecting bars between the ring member and the pistons.

---

Figure 1:
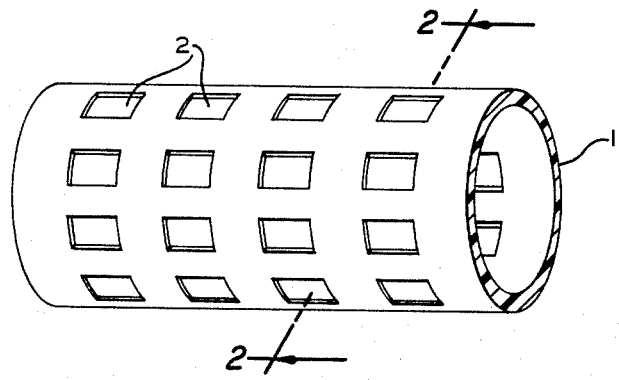

This invention relates to thermoplastic articles. In one of its aspects it relates to an article with surface indentations thereon. In another aspect it relates to a thermoplastic pipe with surface indentations on the outer and/or inner surfaces. In another aspect it relates to a method for making an article with surface indentations comprising extruding a shaped thermoplastic material, and applying surface indentations on the surface of said shape right after the material has passed from the extruder. In a still further aspect, it relates to a method for making an article with surface indentations thereon comprising extruding a shaped thermoplastic material, and making indentations on the surface of said shaped thermoplastic material right before said material leaves the extruder. In another of its aspects, the invention relates to an apparatus for carrying out the method of this invention. In a further aspect, the apparatus comprises an extrusion press with means for forming indentations on the surface of the extruded article, fluid pressure actuation means for causing said means for forming indentations to reciprocate in a direction perpendicular to the surface of the extruded article. In a still further aspect, the fluid pressure means are spring biased and a pulsating force is applied to the fluid pressure means against the spring biasing. In a still further aspect, the fluid pressure means consist of a double fluid chamber wherein pressure is applied alternately to either side of the double fluid chamber. In a still further aspect, the apparatus consists of an extrusion press containing an extrusion die head, plungers reciprocatably attached to the die head, means for making indentations in the surface of the extruded article attached to said plungers, and a circular ring which actuates the reciprocating motion of the plunger. In a still further aspect, the invention relates to an apparatus for extruding a thermoplastic material comprising an extrusion press, means attached to the exit end of said extrusion press to cool the extruded thermoplastic shaped material, and a nozzle in said means for cooling thermoplastic material for injecting a fluid into the surface of the thermoplastic material.

The price of thermoplastic products is largely determined by the amount of material used to make the same. Further, the strength of thermoplastic materials can be altered by various workings of the polymer such as orientation and by the general configuration of the article formed. For example, plastic pipe strength can be varied by producing different orientations in the pipe. It has now been found that the cost of an article can be cut and the strength of an article such as a pipe can be increased in certain directions by forming on the surface of the pipe a plurality of indentations in a specified pattern as the pipe is being extruded.

It is therefore an object of this invention to produce an article with surface indentations. It is a further object of this invention to produce a plastic pipe of improved strength and characteristics at a lower cost. It is a further object of this invention to provide a method for producing such an article. It is a still further object of this invention to provide an apparatus for carrying out the method of this invention. Other objects, aspects, and the several advantages of this invention are obvious from a study of this disclosure, the drawings, and the appended claims.

According to the invention there is provided an article such as a plastic pipe which has surface indentations thereon. The indentations can be in a regular manner so as to strengthen the flexure strength of the pipe or to strengthen the bursting strength of the pipe or simply for decorative purposes.

Further, according to the invention, there is provided a method for forming an article with surface indentations thereon. The article preferably is extruded and the indentations are made on the thermoplastic article as the material in a plastic state passes out of the extruder. The indentations can be made in a cooling zone by injecting the fluid into the surface, thereby displacing plastic material. In the case of a pipe, the indentations could be made on the inner surface or on the outer surface. Further, the indentations can be made by a reciprocating plunger with a die having the desired shape of the indentations on the end of said plunger.

Still further according to the invention, there is provided an apparatus to produce a thermoplastic article with surface indentations. According to the invention, the machine is composed of an extrusion means, and means for forming surface indentations on the article as it is extruded from the extrusion die opening. In one embodiment of the invention, the apparatus consists of at least one reciprocating plunger with a shaped die head on one end. In a more specific aspect, the plunger can be actuated by a hydraulic system or can be actuated by a mechanical ring system. In a still further aspect of the invention, the apparatus can have a cooling section to cool the thermoplastic article as it is extruded from the machine, and a nozzle to inject the fluid onto the surface or into the surface of the article as it is being cooled in the cooling section. In the latter aspect, the fluid can be applied either incrementally or continuously.

Figure 2:
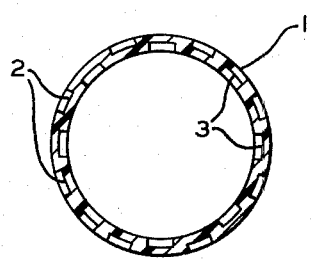
Figure 3:
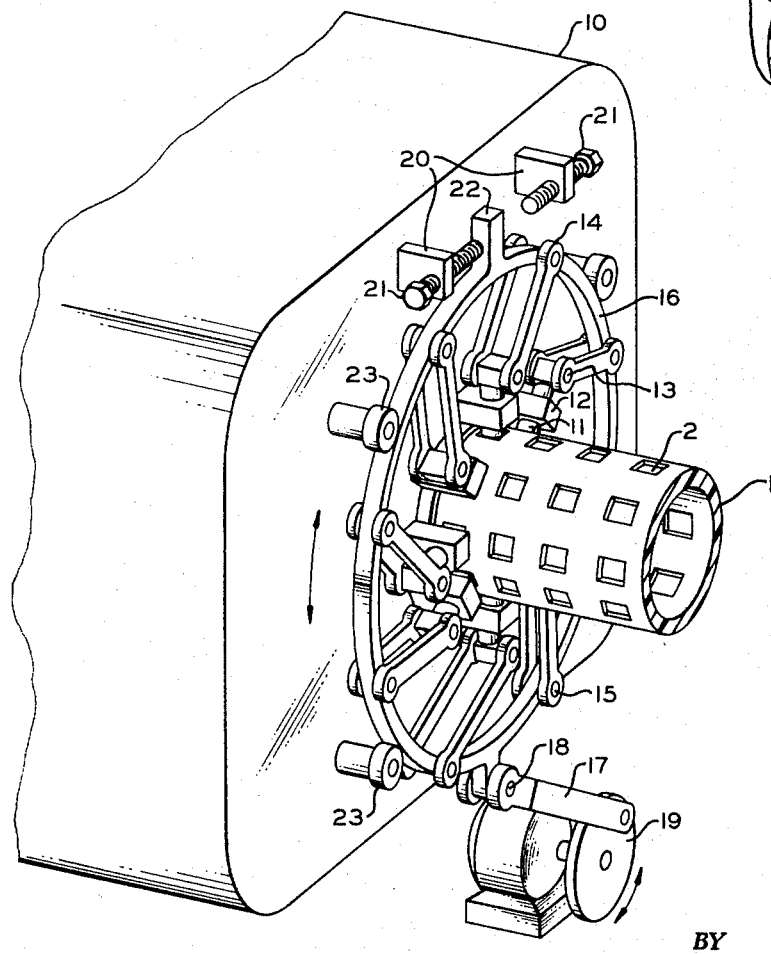
Figure 4:
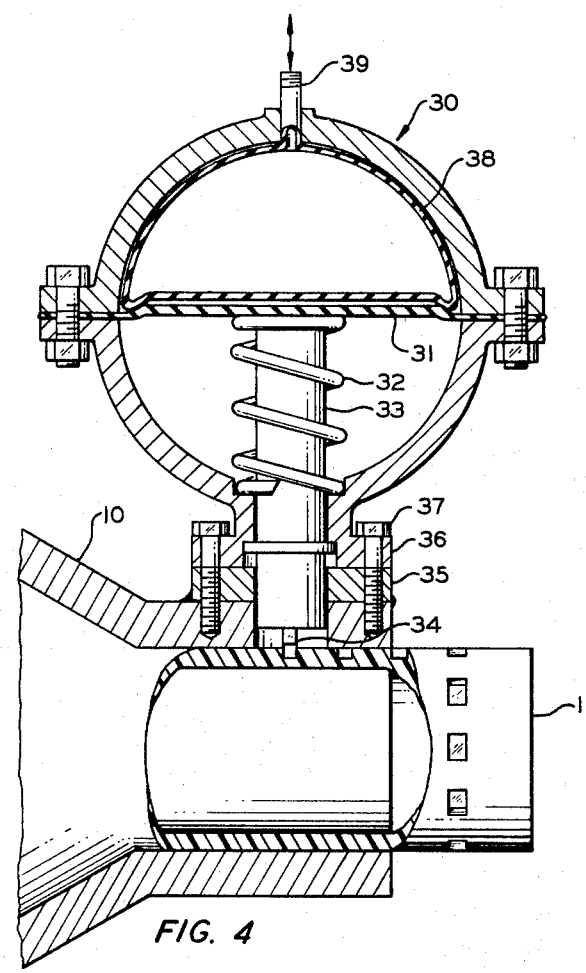
Figure 5:
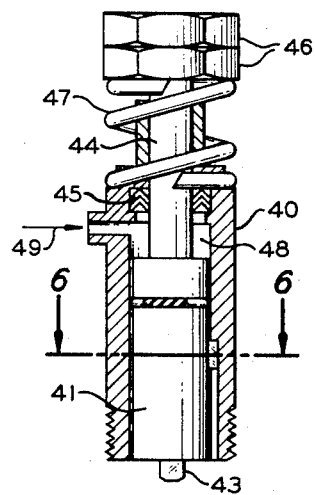
Figure 6:
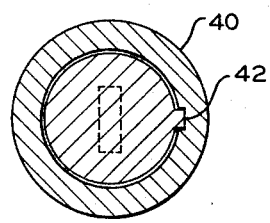
Figure 7:
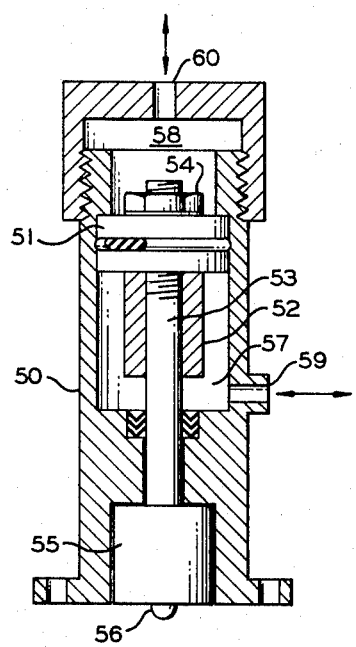
Figure 8:
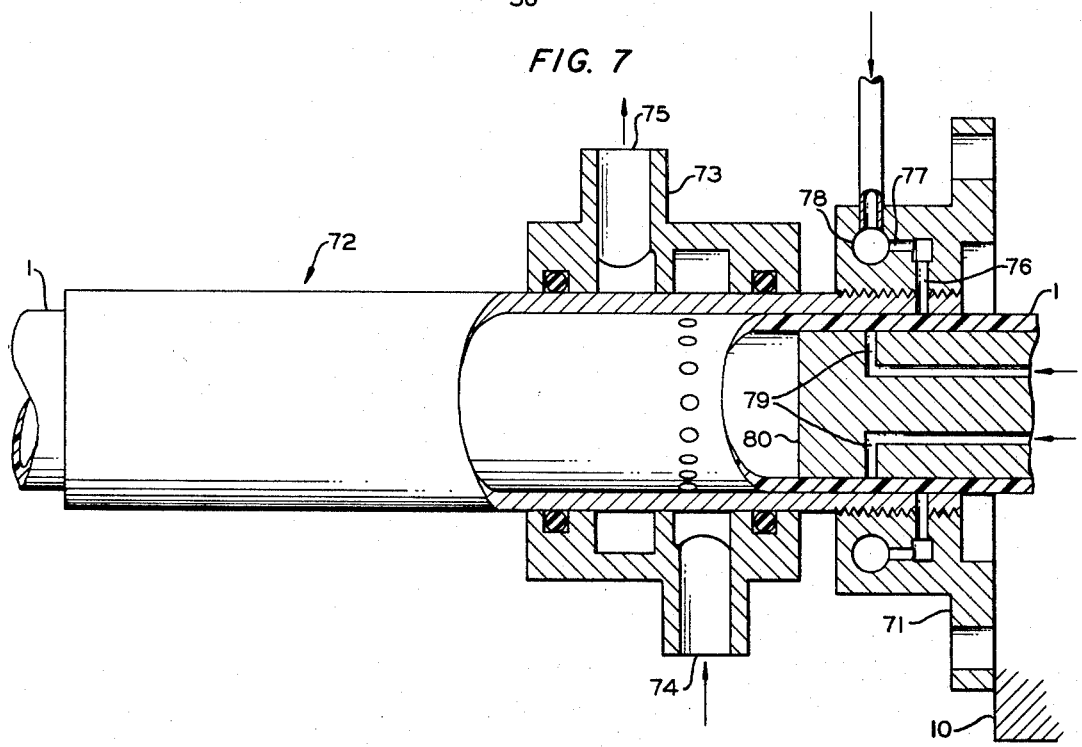

The invention can be better understood by reference to the accompanying drawings. FIGURE 1 shows an article produced according to the invention. FIGURE 2 is a cross-section through 2—2 of FIGURE 1. FIGURE 3 is an isometric view of the extrusion apparatus and one embodiment of the means for producing surface indentations. FIGURE 4 is a cross-section of a hydraulic cylinder attached to the exterior die face showing one embodiment of the invention. FIGURE 5 shows a cross-section of another means for providing surface indentations on the extruded material. FIGURE 6 is a cross-section through 6—6 of FIGURE 5. FIGURE 7 is a cross-section of still another embodiment of the invention showing a means to provide surface indentations on the extruded article. FIGURE 8 is a cross-section of a means for providing grooves and indentations on the outer and inner surfaces of an extruded pipe by using a pressurized fluid.

Referring now to FIGURES 1 and 2, 1 is a thermoplastic pipe having surface indentations 2 on the outer surface of the pipe and surface indentations 3 on the inner surface of the pipe. Pipe 1 can be any thermoplastic extrudable material such as polyethylene, polypropylene, polybutene, and copolymers thereof. In this embodiment of the invention, the pipe is shown with a series of regular indentations forming the lined rows in circumferential and axial directions. In this particular configuration, the pipe will have increased resistance to bending but will have reduced resistance to collapse and burst strength. If the indentations are arranged in longitudinal or axial lines, the pipe will have increased resistance to bending but reduced resistance to collapse and bursting. If the indentations are arranged in a circumferential manner such as in the manner of circular rings, the pipe will have increased collapse strength but reduced burst and bending strength. If the indentations are arranged in a helical pattern, it is possible to improve the torque strength. Thus, it is possible, by varying the configuration of the indentations on the surface, to produce a pipe with increased strength properties in at least one direction. Further, it is seen that the indentations provide a pipe with less mass having equal strength in a selected direction to an unindented pipe, thus making a cheaper pipe. Further, the indentations on the surface can provide a decorative effect for the surface.

Referring now to FIGURE 3, an embodiment of the invention is shown wherein indentations are made on the surface of an extruded pipe by means of reciprocating plungers 11 secured to the exterior die face of an extruder 10. The plungers are restricted by blocks 12 attached on the die face of extruder 10 in such a manner that the plungers are free to reciprocate in an axial direction. Connecting rod 14 is rotatably attached to plunger 11 at pin 13 on one end and rotatably attached to ring 16 at pin 15. Ring 16 is supported on rolls 23 so that it is free to move in a rotational direction. Ring 16 is actuated to rotatably reciprocate by bar 17 rotatably attached to ring 16 at pin 18 on one end and rotatably attached to wheel 19 at the other end. The rotational motion of the ring 16 is further restricted by screws 21 attached to locks 20 which are attached to the face of the die plate. The extension 22 of ring 16 is stopped by screw members 21 as ring member 16 rotates in one direction and then the other. In operation, a thermoplastic article such as a pipe 1 is extruded from the machine 10. As the pipe passes out of the extrusion die, the plungers are actuated by ring member 16 to form indentations 2 in the surface of the pipe. The reciprocating motion of the pistons produces the desired effect on pipe 1. It is obvious that as many plungers as desired can be added to the die face of the extruder 10 to produce any desired effect in the extruded pipe 1.

Referring now to FIGURE 4, the plastic pipe 1 flows out of the extruder 10 in the plastic condition. A hydraulic cylinder 30 actuates a die plunger blade 34 to produce the desired indentations in the surface of the article as it is being extruded. The cylinder 30 is composed of a diaphragm 31 which divides the cylinder 30 into two sections. The lower section is composed of a spring 32 which biases the diaphragm in an upward position. Rod or plunger 33 is attached to the diaphragm at the upper end and is attached to the die plunger blade at the lower end. The hydraulic cylinder 30 is fastened onto the extrusion machine 10 by members 35, 36, and 37. The upper half of the hydraulic cylinder is occupied by a bladder 38 which has an inlet means 39. In operation, hydraulic fluid supplied with alternating fluid pressure actuates the diaphragm to force the die plunger blade 34 into the thermoplastic material 1. The upward motion of the die plunger blade 34 and rod 33 is actuated by spring 32. It is obvious that there can be provided on the die face of the extruder 10 a plurality of similar hydraulic cylinders 30 such as pictured herein. The fluid used in the cylinder can be any suitable organic or inorganic fluid including pressurized gases, water, formaldehyde or other hydraulic fluids.

FIGURE 5 shows another embodiment of the invention. A hydraulic cylinder 40 can be substituted for cylinder 30 to perform the same purpose as cylinder 30. In this embodiment of the invention, cylinder 40 has a piston chamber 48, with piston 41 slidably inserted therein.

One end of piston 41 is formed into the shape of a die plunger blade 43 and serves to make indentations in the surface of plastic material as it flows from the die head. The rotation of piston 41 is restricted by slot 42 shown more clearly in FIGURE 6. A projection on piston 41 reciprocates in slot 42. Rod 44 is attached to the upper end of piston 41 and extends out of cylinder 40 and has adjustable nuts 46 on the end thereof. A spring 47 provides a means for biasing the piston 41 in the upper position. Opening 49 is provided for introducing pulsating fluid which causes the piston to move downwardly and deform the surface of plastic material as it is extruded from the extruder. The spring 47 provides actuation for the return movement of the piston. A flat blade 43 provides means with which the thermoplastic material is indented.

FIGURE 7 shows another embodiment of the invention wherein a hydraulic cylinder can be used for a function similar to that device shown in FIGURE 4 and FIGURE 5. In this embodiment of the invention, a cylinder 50 is provided with a piston chamber 57, 58. A piston 51 with adjustable length stop collar 52, rod 53, and rod attachment 54 are operatively placed in the cylinder chamber. Block 55 with blade 56 on the end is attached to rod 53. Rotational movement of block 55 and blade 56 can be prevented by providing a groove in the cylinder 50 similar to groove 42 in FIGURES 5 and 6. An opening 59 is provided in cylinder 50 for introducing hydraulic fluid into a section 57 of the piston chamber. Similarly, an opening 60 is provided in the other end of the piston chamber to allow hydraulic fluid to be introduced into section 58 of the piston chamber. In operation, hydraulic fluid will be supplied under pressure to each of the openings 59 and 60. The pressure on the hydraulic fluid will alternate from that going into opening 59 to that going into opening 60. Movement of the hydraulic fluid will cause the piston to be actuated reciprocatably in the piston chamber, thus causing the blade 56 to reciprocate and form indentations in the surface of plastic material as it is extruded from a die. It is obvious that the means for supplying the fluid to openings 59 and 60 can be operably connected to each other.

The cylinders of FIGURES 4, 5, 6 and 7 can be arranged in any configuration around the die opening to provide the desired effect on the surface of the extruded article. It is obvious that any combination of these cylinders can be provided around an extrusion die opening.

Referring now to FIGURE 8, there is provided a cooling section 72 which can be attached to the die face of extruder 10 at the flange 71. In this particular embodiment of the invention, a pipe is being extruded and is forced through section 72. There is provided a cooling chamber 73 with water inlet 74 and outlet 75. Nozzle 76 supplies fluid under pressure to the surface of pipe 1 as it is extruded and forced into said cooling section 72. The fluid can be supplied to nozzle 76 through conduit 77 and header 78. If a series of nozzles similar to 76 are positioned around the flange 71, it is obvious that header 78 could supply fluid to all of the nozzles through conduits similar to 77. The fluid can be supplied constantly or intermittently to produce continuous or interrupted indentations on the surface of the pipe. The fluid can be liquid or gaseous, depending upon the availability of same. Mandrel 80 maintaining the shape of pipe 1 as it is extruded from the extrusion machine can contain one or a series of nozzles 79 for injecting fluid into the inner surface of the pipe 1 as it passes through the cooling section. In operation, a pipe is extended from extruder 10 and passed into section 72 for cooling. As the pipe passes through section 72, fluid is introduced continuously or intermittently through nozzles 76 and 79. The fluid displaces the deformable plastic and causes surface indentations on the inner and outer surface of the pipes.

While the invention has been described with regard to extruding poly 1-olefin materials, it is obvious that any extrudable material could be used. For example, any plastic material, including clay or foamed material could be used. Other suitable plastic materials include polyvinyl chloride, polybutadiene, polyisoprene, polymers of acrylonitrile and the like.

While the invention is generally drawn to forming indentations in an extruded object, it is within the scope of the invention to have as indentations, the extruded form and apply blobs to the surface of the extruded object to form a series of raised portions on the surface.

Further, it is within the scope of the invention to form indentations only on selected sections of the object as it is extruded. It is within the scope of the invention, for example, to form indentations on one side of a solid rod as it is extruded. In such a way, the rod will curl and form a plastic coil. A hollow rod or tube could be made to curve in the same manner.

While the invention has been described generally with regard to round objects, it is obvious that other types of objects can be employed. For example, objects which in cross section are elliptical, square, rectangular, or any shape whatsoever can be used.

It is important that the object be deformed while in the plastic state. Thus, it is possible to extrude an object, let it cool and reheat it to the plastic state, and then deform it. Further, the object can undergo some intermediate treatment such as stretching and orientation before having the indentations put into the surface.

A corrugated object, such as a plastic pipe, can be formed by forcing air pressure intermittently through a collar surrounding the pipe as the pipe is extruded and while the pipe is in the plastic state. Thus, the intermittent pressure causes a series of circular indentations on the pipe as it is extruded. Such a pipe could possess superior bending properties to enable the pipe to bend around the corners, for example.

The corrugations can also be produced by using vacuum instead of pressure. In such a case the pipe will be deformed outwardly in lieu of inwardly. It is also contemplated that alternating pressure and vacuum can be used to produce the corrugated object. A rotating valve could be used to switch from the pressure to vacuum at a rapid rate.

It is within the scope of the invention to use the means for forming indentations in the surface of the extruded article for injecting into said surface a liquid or powdered dye or pigment. In such a way the extruded object could be colored by injecting the dye into the surface thereof as it is extruded.

Reasonable variation and modification are possible within the scope of this disclosure, drawing, and the appended claims to the invention, the essence of which is that there is provided an article with indentations thereon, a method for making such an article consisting of extruding the article and making indentations in the surface of the article while the article is still in a plastic condition, and an apparatus for producing an article with surface indentations comprising an extruder, and a means near the section of the extruder where the article passes from the extruder for forming surface indentations on said article surface.

I claim:

1. An apparatus for producing an extruded thermoplastic article whose surface has at least one indentation comprising die means; extruder means for moving thermoplastic material through said die means to form an extruded thermoplastic article; a plurality of reciprocating plungers, each of said reciprocating plungers having a first end and a second end; means for positioning each of said plurality of reciprocating plungers to permit axial reciprocation of said plungers from a retracted position to an extended position where the first end of each of said plungers contacts the surface of said extruded thermoplastic article while said extruded thermoplastic article is in a deformable condition to form an indentation in said surface of said extruded thermoplastic article; a ring member mounted coaxially with respect to said extruded thermoplastic article; means for rotatably connecting the second end of each of said plungers to said ring member; and means for rotatably reciprocating said ring member to thereby cause the axial reciprocation of said plungers; said means for rotatably connecting the second end of a plunger to said ring member comprising a bar having a first end and a second end, means for pivotally connecting said first end of said bar to said ring member and means for pivotally connecting said second end of said bar to said second end of a respective one of said plungers.

2. Apparatus in accordance with claim 1 further comprising an extension on said ring member, first adjustable stop means positioned in the path of movement of said extension to adjustably limit the extent of rotation of said ring member in a first direction and second adjustable stop means positioned in the path of movement of said extension to adjustably limit the extent of rotation of said ring member in the direction opposite to said first direction.

References Cited

UNITED STATES PATENTS

| Re. 25,570 | 5/1964 | Lemelson | 25—17 X |
|---|---|---|---|
| 1,408,877 | 3/1922 | Funk | 25—20 X |
| 1,445,740 | 2/1923 | Baumgartner | 25—20 |
| 2,153,307 | 4/1939 | Jansen | 25—20 |
| 2,483,584 | 10/1949 | Lesavoy | 264—93 X |
| 2,582,645 | 1/1952 | Milliken et al. | 25—20 |
| 2,834,983 | 5/1958 | Norton | 25—105 X |
| 3,183,571 | 5/1965 | Schmunk et al. | 25—105 |

FOREIGN PATENTS

| 135,509 | 11/1933 | Austria. |
|---|---|---|
| 464,546 | 8/1928 | Germany. |

WILLIAM J. STEPHENSON, *Primary Examiner.*

LAVERNE D. GEIGER, *Examiner.*

T. L. MOORHEAD, *Assistant Examiner.*